United States Patent
Males et al.

(10) Patent No.: US 11,880,416 B2
(45) Date of Patent: Jan. 23, 2024

(54) SORTING DOCUMENTS ACCORDING TO COMPREHENSIBILITY SCORES DETERMINED FOR THE DOCUMENTS

(71) Applicant: INTERNATIONAL BUSINESS MACHINES CORPORATION, Armonk, NY (US)

(72) Inventors: Kevin Males, Kings Lynn (GB); Alister James Brain, Cambridge (GB)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 17/076,357

(22) Filed: Oct. 21, 2020

(65) Prior Publication Data

US 2022/0121713 A1 Apr. 21, 2022

(51) Int. Cl.
| | | |
|---|---|---|
| G06F 16/9535 | (2019.01) | |
| G06F 16/2457 | (2019.01) | |
| G06F 16/93 | (2019.01) | |
| G06F 40/205 | (2020.01) | |
| G06F 16/9538 | (2019.01) | |
| G06F 40/20 | (2020.01) | |

(52) U.S. Cl.
CPC ........ G06F 16/94 (2019.01); G06F 16/24578 (2019.01); G06F 16/9535 (2019.01); G06F 16/9538 (2019.01); G06F 40/20 (2020.01); G06F 40/205 (2020.01)

(58) Field of Classification Search
CPC ........... G06F 16/24578; G06F 16/9535; G06F 16/248
See application file for complete search history.

(56) References Cited

U.S. PATENT DOCUMENTS

| | | | | |
|---|---|---|---|---|
| 5,359,514 A | * | 10/1994 | Manthuruthil | G06F 40/55 715/236 |
| 6,006,218 A | * | 12/1999 | Breese | G06F 16/951 |
| 8,498,974 B1 | * | 7/2013 | Kim | G06F 16/24578 707/706 |

(Continued)

FOREIGN PATENT DOCUMENTS

CN 111753043 A * 1/2020 ........... G06F 16/322

OTHER PUBLICATIONS

HTML, "Microdata", 2018, pp. 35. [online][retrieved Oct. 5, 2020] https://www.w3.org/TR/2018/WD-microdata-20180426/.

(Continued)

*Primary Examiner* — Benjamin Smith
(74) *Attorney, Agent, or Firm* — Konrad Raynes Davda & Victor LLP; David W. Victor

(57) ABSTRACT

Provided are a computer program product, system, and method for sorting documents according to comprehensibility scores determined for the documents A determination is made of sections of text in the document associated with taxonomy topics. A determination is made of a determining a comprehensibility score of the document as a function of the sections of text and familiarity scores of the taxonomy topics associated with the sections of text in the document. Each familiarity score indicates a user familiarity with a taxonomy topic. The comprehensibility score is used for the document to determine an order in which to present the document to the user with a group of documents.

25 Claims, 6 Drawing Sheets

(56) References Cited

U.S. PATENT DOCUMENTS

| | | | | |
|---|---|---|---|---|
| 8,714,986 | B2* | 5/2014 | Dodelson | G09B 7/00 434/350 |
| 9,098,570 | B2* | 8/2015 | Zhang | G06F 16/9535 |
| 9,298,777 | B2* | 3/2016 | Lawrence | G06F 16/93 |
| 9,336,204 | B1* | 5/2016 | Amundsen | G06F 40/40 |
| 9,575,961 | B2* | 2/2017 | Seuss | G06F 40/30 |
| 10,002,196 | B2* | 6/2018 | Zhang | G06F 16/3334 |
| 10,102,272 | B2* | 10/2018 | Musuluri | G06F 16/313 |
| 10,191,951 | B1* | 1/2019 | Bronstein | G06F 16/24578 |
| 10,303,771 | B1* | 5/2019 | Jezewski | G06F 18/2413 |
| 10,380,147 | B1* | 8/2019 | Omland | G06F 16/30 |
| 10,380,252 | B2* | 8/2019 | Seuss | G06T 11/60 |
| 10,402,465 | B1* | 9/2019 | Jain | H04L 67/535 |
| 10,489,512 | B2* | 11/2019 | Jezewski | G06F 40/216 |
| 10,877,980 | B1* | 12/2020 | Bronstein | G06F 16/24578 |
| 10,902,201 | B2* | 1/2021 | Hewitt | G06N 20/00 |
| 10,990,602 | B2* | 4/2021 | Bangalore Narayanamurthy | G06F 16/9024 |
| 10,990,767 | B1* | 4/2021 | Smathers et al. | G06N 5/022 |
| 11,273,552 | B2* | 3/2022 | Ku | B25J 9/1653 |
| 11,341,330 | B1* | 5/2022 | Smathers et al. | G06F 40/289 |
| 11,354,513 | B2* | 6/2022 | Modani | G06V 30/416 |
| 11,397,897 | B2* | 7/2022 | Ameri | G06F 16/285 |
| 11,645,317 | B2* | 5/2023 | Tolman | G06F 16/35 707/722 |
| 2005/0071328 | A1* | 3/2005 | Lawrence | G06F 16/248 |
| 2006/0064637 | A1* | 3/2006 | Rechterman | G06Q 30/00 715/205 |
| 2006/0282413 | A1* | 12/2006 | Bondi | G06F 16/9038 |
| 2007/0067294 | A1* | 3/2007 | Ward | G06F 16/9535 |
| 2009/0024605 | A1* | 1/2009 | Yang | G06F 16/9535 707/999.005 |
| 2009/0311657 | A1* | 12/2009 | Dodelson | G09B 7/00 434/350 |
| 2010/0088331 | A1* | 4/2010 | White | G06F 16/24578 707/759 |
| 2012/0254161 | A1* | 10/2012 | Zhang | G06F 16/24578 707/723 |
| 2013/0325779 | A1* | 12/2013 | Shahshahani | G06N 5/00 706/46 |
| 2014/0193796 | A1* | 7/2014 | Dodelson | G09B 5/10 434/365 |
| 2015/0052121 | A1* | 2/2015 | Sharifi | G06F 16/24578 707/723 |
| 2015/0278211 | A1* | 10/2015 | Voronel | G06F 16/444 707/728 |
| 2015/0294017 | A1* | 10/2015 | Zhang | G06F 16/3334 707/730 |
| 2016/0062986 | A1* | 3/2016 | Seuss | G06T 11/60 704/9 |
| 2016/0140186 | A1 | 5/2016 | Langen | |
| 2016/0179805 | A1* | 6/2016 | Bolshinsky | G06F 16/33 707/723 |
| 2017/0011039 | A1* | 1/2017 | Spaulding | G06F 16/9024 |
| 2017/0011043 | A1* | 1/2017 | Musuluri | G06F 16/313 |
| 2017/0116176 | A1* | 4/2017 | Seuss | G06F 40/253 |
| 2017/0132227 | A1* | 5/2017 | Bostick | G06F 16/9535 |
| 2017/0186331 | A1* | 6/2017 | Lawrenson | G06Q 30/0256 |
| 2018/0203842 | A1* | 7/2018 | Anders | G06F 40/205 |
| 2018/0203933 | A1* | 7/2018 | DeLuca | G06F 16/9535 |
| 2019/0206510 | A1* | 7/2019 | Jiang | G16B 40/00 |
| 2019/0251172 | A1* | 8/2019 | Jezewski | G06F 16/30 |
| 2019/0324978 | A1* | 10/2019 | Omland | G06F 16/30 |
| 2019/0324997 | A1 | 10/2019 | Bostick et al. | |
| 2019/0384828 | A1 | 12/2019 | Bangalore Narayanamurthy et al. | |
| 2020/0042593 | A1* | 2/2020 | Hewitt | G06N 20/00 |
| 2020/0134039 | A1* | 4/2020 | Alam | G06F 16/3326 |
| 2020/0159795 | A1* | 5/2020 | Weldemariam | G06F 3/0481 |
| 2020/0311092 | A1* | 10/2020 | Thomas | G06F 16/9535 |
| 2020/0409982 | A1* | 12/2020 | Buchanan | G06N 5/045 |
| 2021/0004420 | A1* | 1/2021 | Mittal | G06F 16/9024 |
| 2021/0073237 | A1* | 3/2021 | Wang | G06F 16/24575 |
| 2021/0073654 | A1* | 3/2021 | Ameri | G06F 16/9536 |
| 2021/0216937 | A1* | 7/2021 | Dhaygude | G06N 5/04 |
| 2021/0248322 | A1* | 8/2021 | Modani | G06F 9/30036 |
| 2021/0248323 | A1* | 8/2021 | Maheshwari | G06V 30/416 |
| 2022/0016767 | A1* | 1/2022 | Ku | B25J 9/1697 |

OTHER PUBLICATIONS

SCHEMA.org, "Getting Started", [online][retrieved Oct. 11, 2020], pp. 9, https://schema.org/docs/gs.html.

Wikipedia, "Microdata", May 11, 2020, pp. 5, [online] https://en.wikipedia.org/w/index.php?title=Micrdodata_(HTML)&oldid=956138522.

Wikipedia, "PageRank", Oct. 18, 2020, pp. 15, [online] https://en.wikipedia.org/w/index.php?title=PageRank&oldid=984082672.

X. Yan, et al., "Concept-based Document Readability in Domain Specific Information Retrieval," ACM, Nov. 2006, 10 pp.

X. Yan, et al., "Toward a Semantic Granularty Model for Domain-Specific Information Retrieval," ACM Transactions on Information Systems, vol. 29, No. 3, Article 15, Jul. 2011, 46 pp.

* cited by examiner

SORTING DOCUMENTS ACCORDING TO COMPREHENSIBILITY SCORES DETERMINED FOR THE DOCUMENTS

BACKGROUND OF THE INVENTION

1. Field of the Invention

The present invention relates to a computer program product, system, and method for sorting documents according to comprehensibility scores determined for the documents.

2. Description of the Related Art

Information retrieval systems, such as search engines, process a user search request to obtain a result set of documents that are typically sorted and ranked according to the popularity of the documents, which may be measured as a number of references from other documents, such as using the PAGERANK® algorithm. (PAGERANK is a registered trademark of Google LLC throughout the world). PAGERANK works by counting the number and quality of links to a page to estimate the importance of the website. In this way, hypertext links to web pages having a greater number of references from other pages are ordered higher in the list of documents presented to the user than documents with fewer links from other pages.

There is a need in the art for improved techniques for determining an order in which to present a list of documents to a user, such as a list of hypertext links to documents, that are returned in response to a search request from a user.

SUMMARY

Provided are a computer program product, system, and method for sorting documents according to comprehensibility scores determined for the documents A determination is made of sections of text in the document associated with taxonomy topics. A determination is made of a determining a comprehensibility score of the document as a function of the sections of text and familiarity scores of the taxonomy topics associated with the sections of text in the document. Each familiarity score indicates a user familiarity with a taxonomy topic. The comprehensibility score is used for the document to determine an order in which to present the document to the user with a group of documents.

With the above embodiment, documents are scored according to a comprehensibility score calculated as a function of sections of text associated with taxonomy topics in the document and familiarity scores for the taxonomy topics. This ensures that user comprehensibility information is provided that indicates the documents that are most comprehensible to the user so the user can select to review documents based on their comprehensibility and avoid the burden of reviewing documents not within the realm of their comprehensibility.

In a further embodiment, the group of documents and the document for which the comprehensibility score is determined comprise a search result set of documents returned in response to a search request from the user. A determination is made, for each document in the group of documents, of a comprehensibility score of the document based on the sections of text in the document associated with the taxonomy topics and the familiarity score of the taxonomy topics associated with the sections of text.

With the above embodiment, the comprehensibility score is determined for each of the documents returned in a search result set for a search request from the user. Further, with the above embodiments, the comprehensibility score is based on the familiarity scores for the taxonomy topics associated with the sections of text in the documents. In this way, the user is provided with information on the comprehensibility of each of the documents returned in a search result set.

In a further embodiment, the using the comprehensibility score for the document to determine the order comprises sorting the group of documents by comprehensibility scores determined for the documents according to the order. The order indicates documents having highest comprehensibility scores first, wherein documents having a higher comprehensibility score are determined more comprehensible to the user based on the familiarity scores than documents having a lower comprehensibility score.

With the above embodiment, the search result set returned for a search request is sorted based on the comprehensibility score of each document so the user is presented with the most comprehensible documents first. This improves the user experience in reviewing search results because the user is assured the highest ranked results are likely to have highest comprehensibility to the user.

In a further embodiment, the taxonomy topics are part of a domain of a schema of taxonomy topics. The document includes tagged taxonomy elements indicating taxonomy topics associated with sections of text in the document. At least one taxonomy topic is associated with a plurality of sections of the text in the document and a plurality of taxonomy topics are associated with at least one of the sections of text in the document.

Further provided is a computer program product, method, and system for determining an order in which to present documents to a user. A determination is made of sections of text in a document associated with taxonomy topics, wherein one section of text is associated with a plurality of taxonomy topics. A determination is made of a comprehensibility score of the document as a function of the sections of text and familiarity scores for taxonomy topics associated with the sections of text. Each familiarity score indicates a user familiarity with the taxonomy topic and the comprehensibility score considers the familiarity scores for the section of text associated with the plurality of taxonomy topics. The comprehensibility score for the document is used to determine an order in which to present the document to the user with a group of documents.

With the above embodiment, documents are scored according to a comprehensibility score calculated as a function of sections of text associated with taxonomy topics in the document and familiarity scores for the taxonomy topics. Further, with the above embodiment, one section of text may be associated with a plurality of taxonomy topics and the comprehensibility score considers the familiarity score for each taxonomy topic associated with the section of text. This ensures that information is provided that indicates the documents that are most comprehensible to the user so the user can select to review documents based on their comprehensibility and avoid the burden of reviewing incomprehensible documents.

In a further embodiment, the document includes a hierarchy of tagged taxonomy elements for the sections of text including a first level tagged taxonomy element nesting a plurality of second level tagged taxonomy elements at a lower level in the hierarchy than the first level tagged taxonomy element. Each of the second level tagged taxonomy elements is associated with a section of text. The determining the comprehensibility score comprises applying a familiarity score associated with the first level tagged taxonomy element to the sections of text associated with the nested second level tagged taxonomy elements. The familiarity score of each second level tagged taxonomy element is applied to the section of text associated with the second level tagged taxonomy element.

With the above embodiment, a hierarchy of tagged taxonomy elements, including sections of text, allows tagged taxonomy elements at a higher level in the hierarchy to apply to nested lower level tagged taxonomy elements, so the familiarity score for a tagged taxonomy element at a higher level in the hierarchy applies to the sections of text in all lower level nested tagged taxonomy elements. This allows the hierarchy to indicate that certain sections of text are associated with multiple taxonomy topics in a hierarchy of taxonomy topics. In this way, the comprehensibility score will consider all the familiarity scores for taxonomy topics associated with a section in a hierarchy of tagged elements.

DETAILED DESCRIPTION

In the current art, a search engine typically sorts a search result set for a search request according to the number of references to the page from other pages. However, sorting documents according to their references does not consider the user's level of knowledge or understanding to comprehend the documents in the search results. For instance, search results including documents on technical subjects may contain technical detail and knowledge beyond the level of comprehension of the user. Presenting such technically detailed documents higher up in the sort order may not be useful or efficient for the user to consider as a response to their search request. Currently, the user has to review the presented documents high in the ordering to determine whether they can comprehend to locate a document most suited to their level of knowledge and understanding, which can be frustrating and a time-consuming exercise for the user.

For example, suppose a reader with a basic understanding of medicine wants to learn about diabetic neuropathy. A GOOGLE® search on that phrase returns a WIKIPEDIA® article at the top of the search results which contains detailed medical content, likely to be too complex for a lay user. Further down the search results list is a more general article that is likely to be more comprehensible and hence useful to the user. (GOOGLE is a registered trademark of Google LLC throughout the world and WIKIPEDIA is a registered trademark of The Wikimedia Foundation throughout the world).

Described embodiments provide improvements to computer technology for determining a sort order of documents to present to a user, such as a search result set of documents returned for a search request, based on comprehensibility scores determined for the documents indicating a degree to which the documents are comprehensible to the user to which the sorted documents are presented. Described embodiments provide improved computer technology to sort documents annotated with taxonomy topics using a structured markup annotation by considering user familiarity scores reflecting a user comfort level with the taxonomy topics annotating the sections of text in the document.

After acquiring a set of documents, for example from a conventional text search, a determination is made of a comprehensibility score for each document as a function of the sections of text and the familiarity scores for taxonomy topics associated with the sections of text in the document. The comprehensibility scores are used to sort the documents according to their comprehensibility to the user. In this way, those documents presented first in the sort order are not only relevant to the search request and retrieved more frequently, but also most comprehensible and hence most meaningful to the user.

Figure 1:
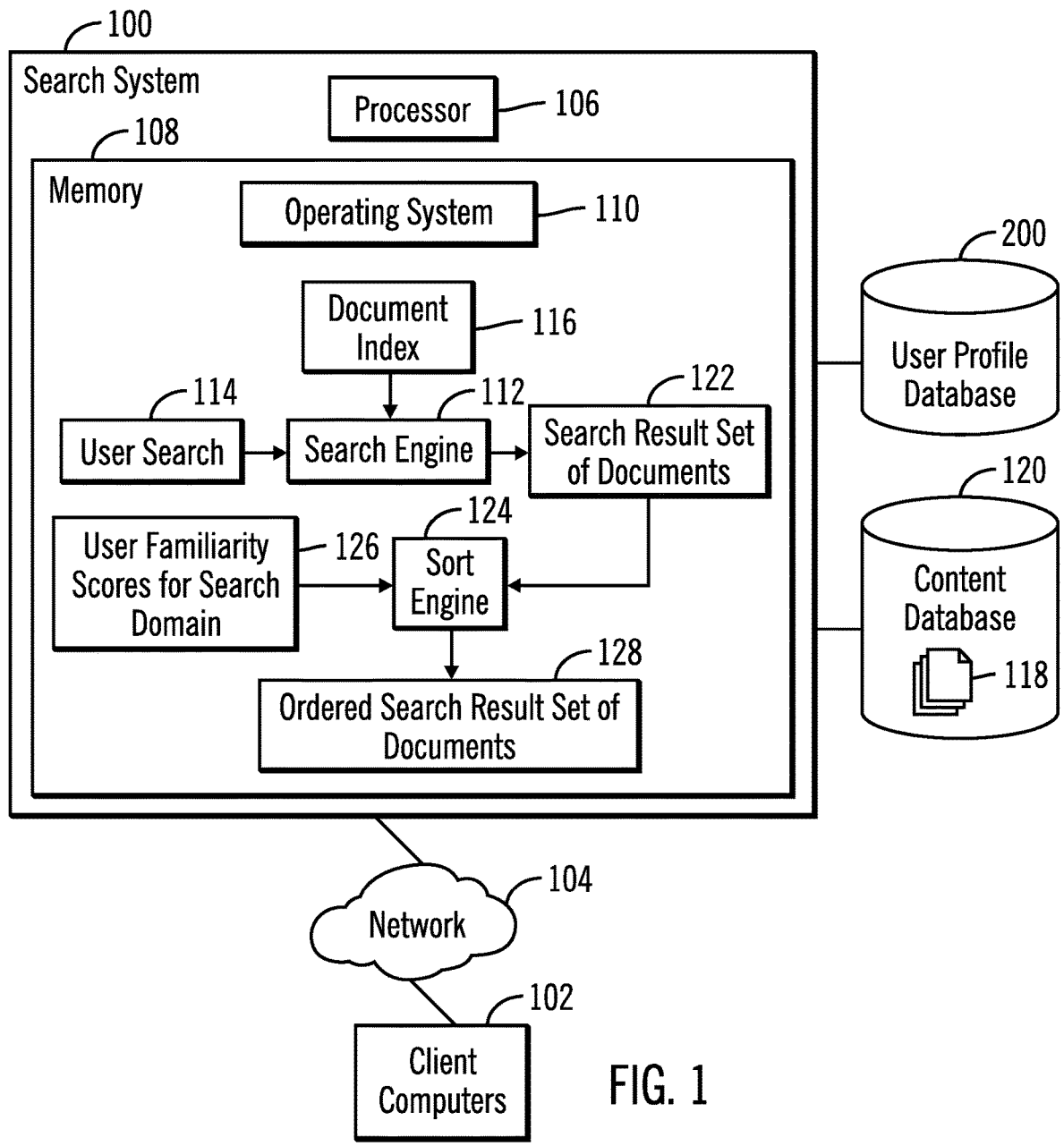
FIG. 1 illustrates an embodiment of a search system.

FIG. 1 illustrates a search system 100 in which embodiments are implemented. The search system 100 receives user searches from client computers 102 over a network 104. The search system 100 includes a processor 106 and a main memory 108. The main memory 108 includes various program components and data structures including an operating system 110 to manage system 100 operations and flow of operations among the program components and data structures, including a search engine 112 and sort engine 124.

The search engine 112 receives a user search 114 query from a client computer 102 and executes the received search 114 against a document index 116 providing indexes, posting lists, etc., to documents 118 in a content database 120, to produce a search result set of documents 122 from the content database 120. The documents 118 may comprise text documents, still images, video, databases, structured documents; etc. The sort engine 124 receives the search result set of documents 122 and user familiarity scores for the search domain 126 from the user profile database 200 and determines an ordered search result set of documents 128. The documents 128 may be ordered based on the comprehensibility of the documents in the search result set 122 to the user based on the user familiarity scores 126 for a domain of the search request and result set of documents 122.

In one embodiment the content of the documents 118 may comprise structured documents annotated with tagged elements, such as hypertext markup language (HTML) tags, to identify taxonomy topics of sections of the documents in a domain of a schema. In one embodiment, the documents 118 may be annotated with HTML Microdata tags that identify tagged portions of text as associated with a taxonomy topic as tagged itemscope elements according to the specification https://www.w3.org/TR/microdata/, which is an HTML syntax for describing content using common vocabularies. The tagged elements may identify taxonomy topics according to a vocabulary domain or schema of taxonomy topics, such as at schema.org. The embodiments may also apply to other content markup taxonomies, such as Linked Data, MathML, etc.

The memory 108 may comprise non-volatile and/or volatile memory types, such as a Flash Memory (NAND dies of flash memory cells), a non-volatile dual in-line memory module (NVDIMM), DIMM, Static Random Access Memory (SRAM), ferroelectric random-access memory (FeTRAM), Random Access Memory (RAM) drive, Dynamic RAM (DRAM), storage-class memory (SCM), Phase Change Memory (PCM), resistive random access memory (RRAM), spin transfer torque memory (STM-RAM), conductive bridging RAM (CBRAM), nanowire-based non-volatile memory, magnetoresistive random-access memory (MRAM), and other electrically erasable programmable read only memory (EEPROM) type devices, hard disk drives, removable memory/storage devices, etc.

Generally, program modules, such as the program components 110, 112, and 124 may comprise routines, programs, objects, components, logic, data structures, and so on that perform particular tasks or implement particular abstract data types. The program components and hardware devices of the search system 100 may be implemented in one or more computer systems, where if they are implemented in multiple computer systems, then the computer systems may communicate over a network.

The program components 110, 112, and 124 may be accessed by the processor 106 from the memory 108 to execute. Alternatively, some or all of the program components 110, 112, and 124 may be implemented in separate hardware devices, such as Application Specific Integrated Circuit (ASIC) hardware devices.

The functions described as performed by the program components 110, 112, and 124 may be implemented as program code in fewer program modules than shown or implemented as program code throughout a greater number of program modules than shown.

The arrows shown in FIG. 1 between the components and objects in the memory 108 represent a data flow between the components.

Figure 2:
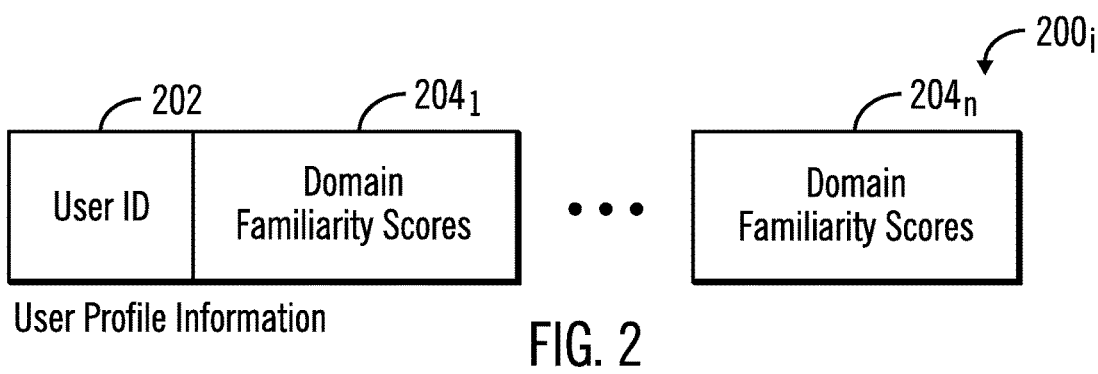
FIG. 2 illustrates an embodiment of user profile information.

FIG. 2 illustrates an embodiment of user profile information $200_i$ in the user profile database 200 for a user submitting search requests, and includes: a user identifier (ID) 202 and one or more instances of domain familiarity scores $204_1$ . . . $204_n$, which provides scores, such as a value from 0 to 1 indicating user familiarity with different taxonomy topics in a domain. The term "user" may refer to a person or computer process, such as a bot. The familiarity scores may be entered by a user via a graphical user interface or determined by an artificial intelligence program, such as a natural language processor or natural language understanding program, that processes information on the user 202 to determine their familiarity with different taxonomy topics in a domain, such as by processing documents read by the user, social media websites maintained by the user, articles or messages written by the user, etc.

Figure 3:
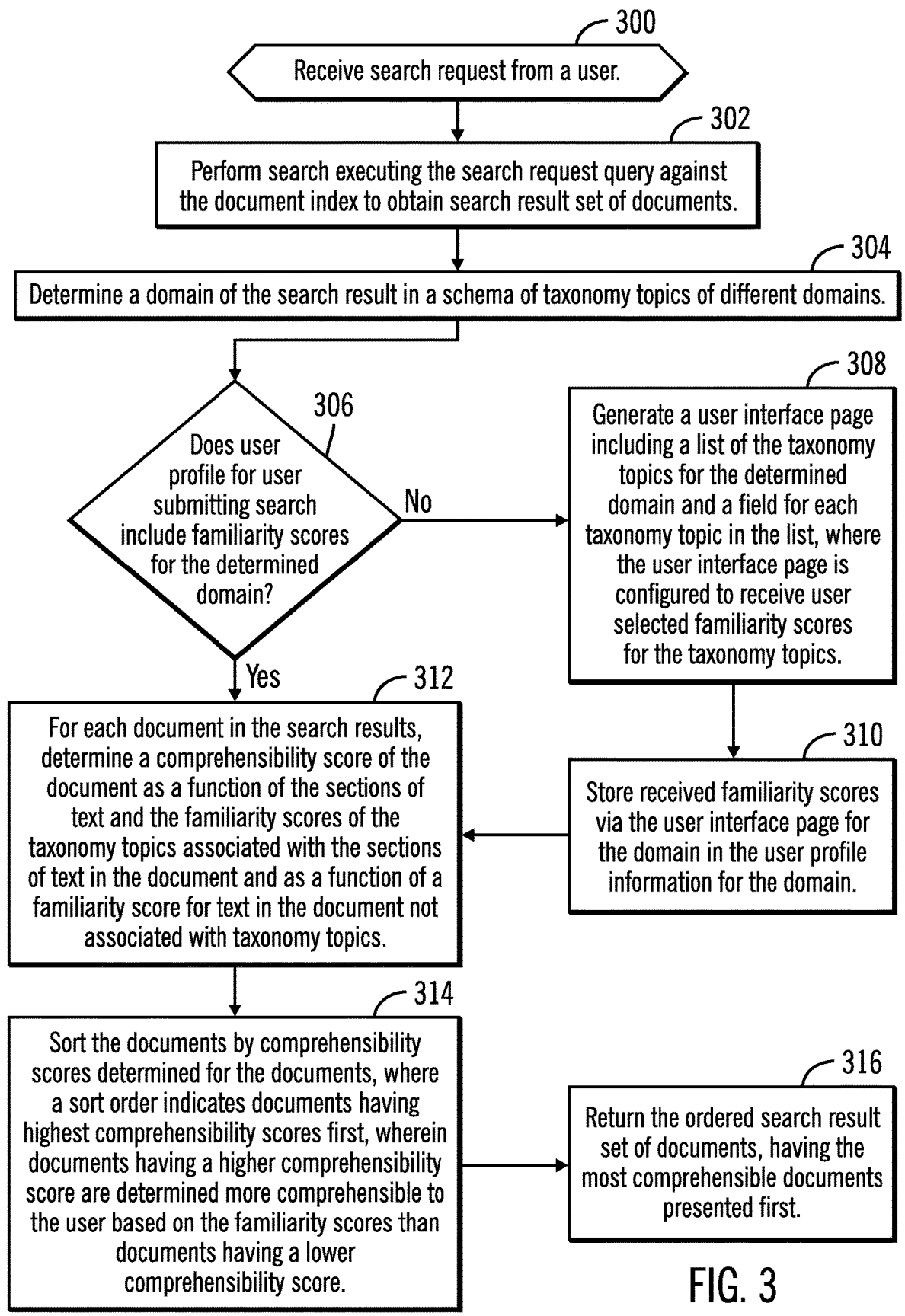
FIG. 3 illustrates an embodiment of operations to process a search request from a user and present a result set of documents sorted according to calculated comprehensibility scores indicating a degree to which the documents are comprehensible to the user.

FIG. 3 illustrates an embodiment of operations performed by the search engine 112 and sort engine 124 to process a user search 114. Upon receiving (at block 300) a user search request 114, the search engine 112 executes (at block 302) the search request query 114 against the document index 116 to obtain a search result set of documents 122. A domain of the search result set 122 in a schema of taxonomy topics of different domains is determined (at block 304). The domain may be determined using a natural language processing and understanding program. In a further embodiment, the domain may be provided explicitly, either by the user or as additional context to the user search.

For example, the user might be using a specific client application to perform searches where that application is already aligned with a domain e.g. medical terminology. Alternatively, the user may search in a document corpus (or using a service that searches a document corpus) where the taxonomy of the documents is already known, such as a medical service or search service provided by a particular industry.

If (at block 306) the user profile information $200_i$ of the user submitting the search request does not include familiarity scores $204_j$ for the determined domain j, then the search engine 112 or other component may generate (at block 308) a user interface page including a list of the taxonomy topics for the determined domain and a field for each taxonomy topic in the list in which the user may enter familiarity scores for the taxonomy topics. The score may comprise a value from 0 to 1, where a higher value indicates a higher user familiarity with the taxonomy topic than a lower value. Other value schemes may be used to indicate familiarity. The familiarity scores received via the user interface page or via other techniques are then stored (at block 310) in the familiarity scores for the determined domain $204_j$ in the user profile information $200_i$.

If (at block 306) the user profile information $200_i$ maintains familiarity scores $204_j$ for the determined domain j or after storing user provided familiarity scores (at block 310), the sort engine 124 determines (at block 312), for each document in the search results 122, a comprehensibility score of the document as a sum of a function of the sections of text and the familiarity scores of the taxonomy topics associated with the sections of text in the document and as a function of a familiarity score for text in the document not associated with taxonomy topics. The documents 122 may comprise structured documents that use tagged taxonomy topic elements to associate taxonomy topics with the sections of text. Other techniques may also be used to associate taxonomy topics with sections of text, such as separate metadata, metadata embedded in the document, etc.

The sort engine 124 may sort (at block 314) the documents in the search results 122 by the comprehensibility scores determined for the documents 122. The sort order may indicate documents having highest comprehensibility scores first. The documents 122 may be initially sorted according to popularity and relevance to the search terms, before being sorted according to comprehensibility resulting in the ordered result set of documents 1289. Documents 122 having a higher comprehensibility score are determined more comprehensible to the user based on the familiarity scores than documents having a lower comprehensibility score. The sort engine 124 returns (at block 316) the ordered search result set of documents 128 sorted by comprehensibility scores to present to the user in an order sorted by comprehensibility. In certain implementations, documents 122 having a comprehensibility score below a low threshold may not be included in the returned ordered search result set of documents 128. The ordered search result set 128 may comprise an HTML page of hypertext links to the documents 128.

With the embodiment of FIG. 3, the documents 118 are annotated with taxonomy topics associated with different sections of text. User familiarity scores for taxonomy topics, specific to a user familiarity with the taxonomy topics, may then be used to determine a comprehensibility score of the document as a whole. In this way, the user is provided those documents that will be most comprehensible and useful to a user's specific knowledge first in the order to increase the usefulness of the search result presentation to the user.

Figure 4:
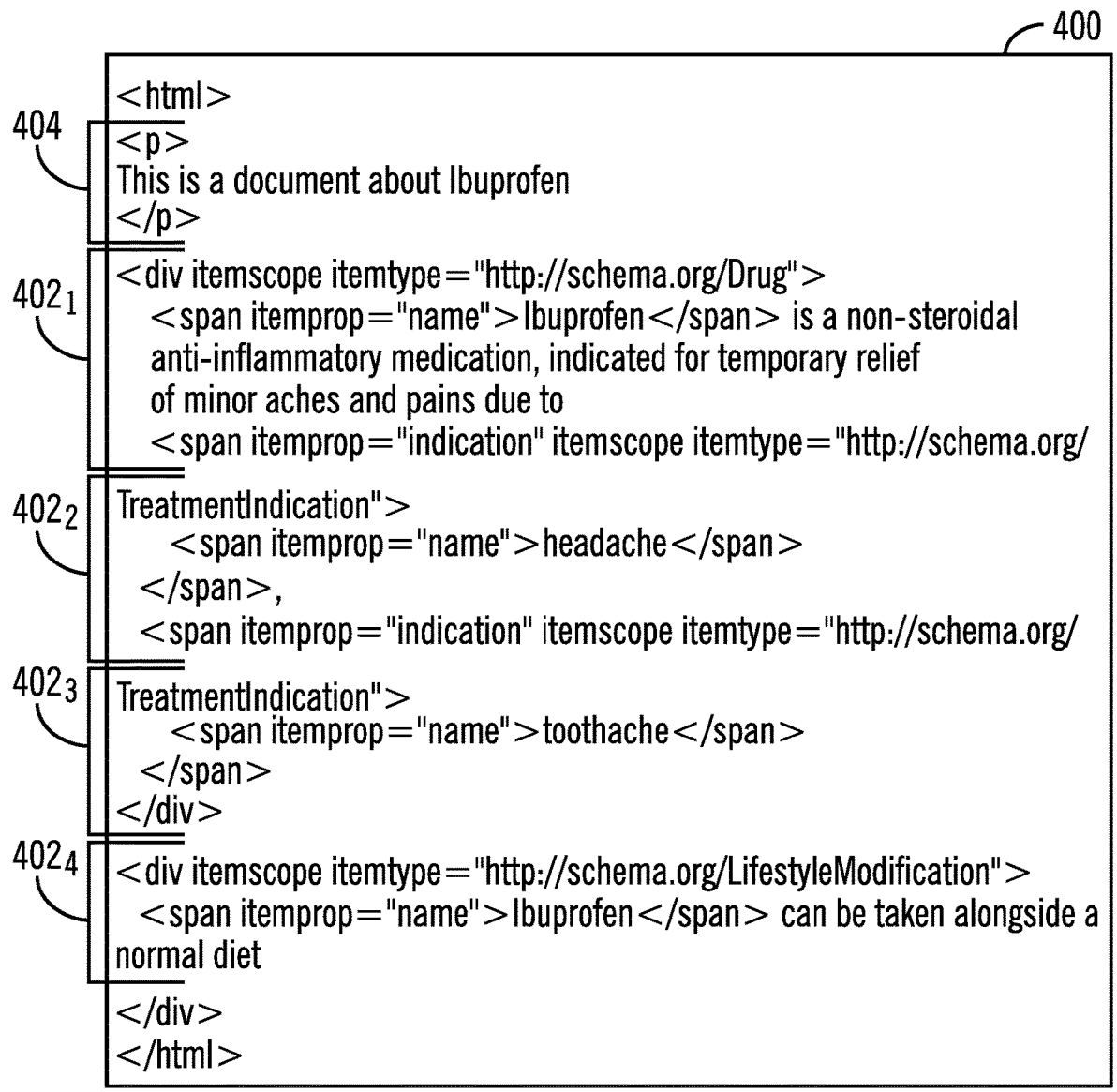
FIG. 4 illustrates an example of a structured document annotated with taxonomy topics.

FIG. 4 illustrates an example of a document 400 having tagged taxonomy elements $402_1$, $402_2$, $402_3$, $402_4$ to associate taxonomy topics and values for the taxonomy topics with sections of text. For instance, the taxonomy topic of "drug" has a value of "Ibuprofen" and the section of text associated with the tagged taxonomy topic $402_1$. Tagged element 404 comprises a section of text not associated with a taxonomy topic, also referred to as unassociated text.

Figure 5:
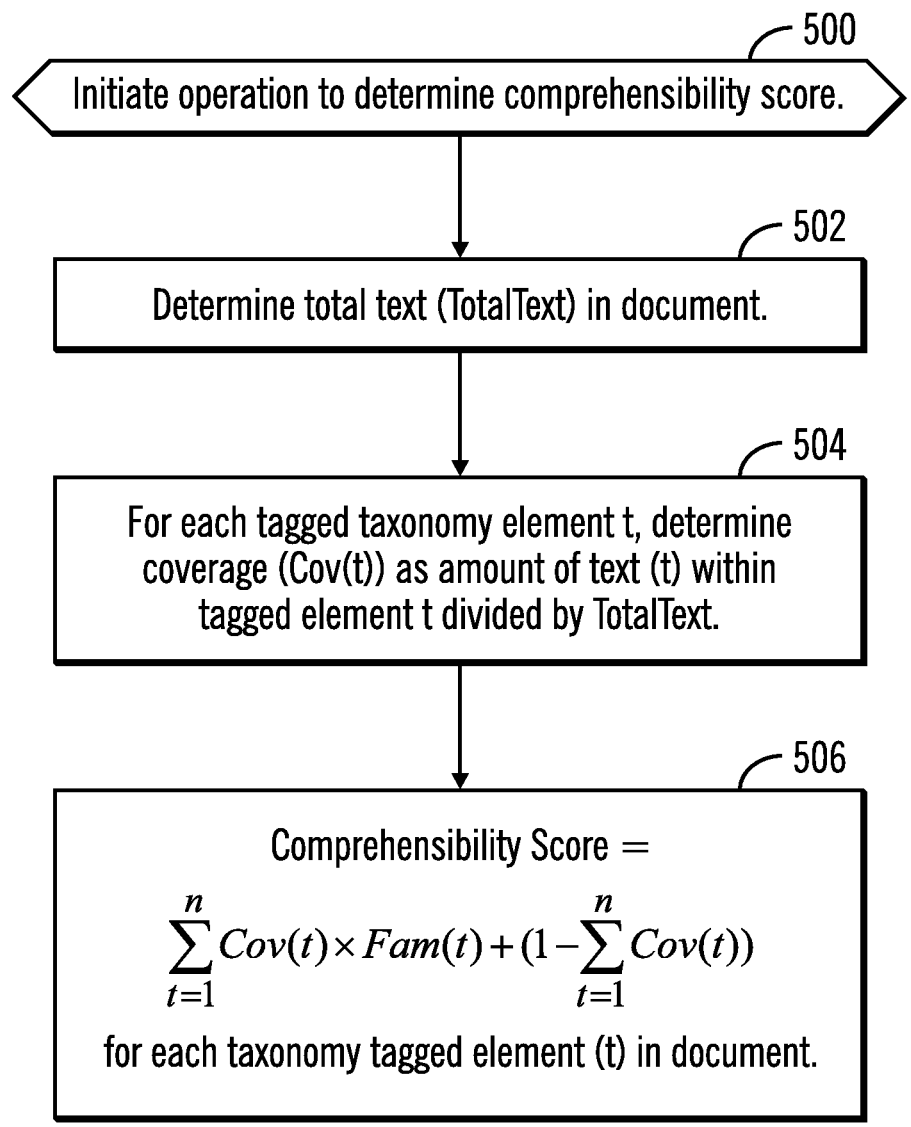
FIG. 5 illustrates an embodiment of operations to determine a comprehensibility score for a document, such as the document in FIG. 4.

FIG. 5 illustrates an embodiment of operations performed by the sort engine 124 to calculate the comprehensibility score for a document from a document having tag taxonomy elements such as shown in FIG. 4. The operations of FIG. 5 may be performed as part of block 312 in FIG. 3 to determine the comprehensibility score for the search result documents 122. Upon initiating (at block 500) an operation to determine a comprehensibility score for a document 118, the sort engine 124 determines (at block 502) the total text in the document (TotalText), such as a number of words, characters, etc. For each tagged taxonomy element t, e.g., $402_1$, $402_2$, $402_3$, $402_4$, a determination is made (at block 504) of the coverage (Cov(t)) as an amount of text (t), e.g., words, for the tagged taxonomy element t divided by the total text, e.g., words, in the document 118. A comprehensibility score may then be calculated (at block 506) as equation (1) below:

$$\sum_{t=1}^{n} \text{Cov}(t) \times \text{Fam}(t) + \left(1 - \sum_{t=1}^{n} \text{Cov}(t)\right) \quad (1)$$

Equation (1) represents the sum of the coverage (Cov(t)) of text for each tagged taxonomy element times the familiarity score (Fam(t)) for that taxonomy element plus the amount of text not associated with tagged taxonomy elements, represented by the second part of the equation of 1 minus the sum of the coverage (Cov(t)) of text for the tagged taxonomy elements. In the embodiment of equation (1) full comprehensibility, or a familiarity score of one, is associated with the unassociated text. In alternative embodiments, a different familiarity score less than one or zero may be applied to the unassociated text 404 not associated with a tagged taxonomy element.

Below is an example of familiarity scores for the taxonomy topics in FIG. 4:

| | | |
|---|---|---|
| Anatomical Structure | 0.0 | (no familiarity) |
| Anatomical System | 0.0 | (no familiarity) |
| Lifestyle Modification | 1.0 | (complete familiarity) |
| Drug | 0.5 | (some familiarity) |
| Treatment Indication | 0.0 | (no familiarity) |

To calculate the score of the document 400 against the user comprehensibility values shown above, the algorithm of FIG. 5 would result in the following calculations:
The total amount of text TotalText=33 (words)
The word counts for the taxonomy topics are:
http://schema.org/Drug=17 (excludes nested TreatmentIndication topics)
http://schema.org/TreatmentIndication=2 (two occurrences)
http://schema.org/LifestyleModification=8
Coverage (Cov(t)) values are:
http://schema.org/Drug=17/33=0.515 http://schema.org/TreatmentIndication=2/33=0.06
http://schema.org/LifestyleModification=8/33=0.242
Document comprehensibility score is:

$$(1-(0.515+0.06+0.242))+0.515*0.5+0.06*0.0+\\ 0.242*1.0=0.683$$

Figure 6:
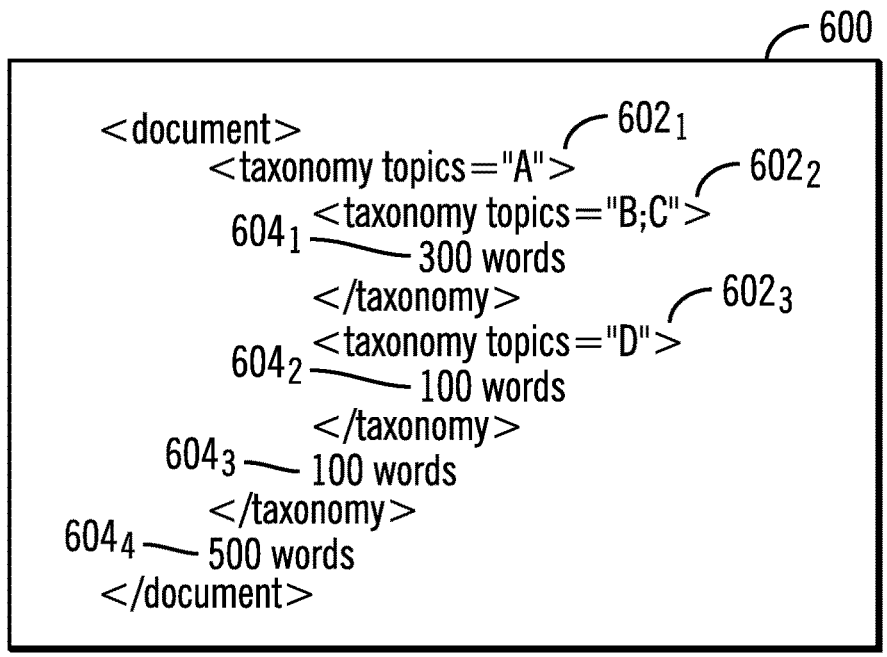
FIG. 6 illustrates an example of a structured document annotated with a hierarchy of taxonomy topics.

FIG. 6 illustrates an example of a structured document 600 providing a hierarchy of annotated tagged taxonomy elements, including a first level tagged taxonomy element $602_1$, associated with taxonomy topic A and nested sections of words $604_1$, $604_2$, $604_3$. The first level tagged taxonomy element $602_1$ has second or lower level tagged taxonomy elements $602_2$, $602_3$ associated with taxonomies B, C and D, respectively. The second level taxonomy elements $602_2$, $602_3$ are associated with words $604_1$, $604_2$, respectively. Document 600 further includes unassociated text $604_4$ not associated with any taxonomy topic. FIG. 6 illustrates how multiple taxonomy topics may be associated with a single section of words directly, such as with tagged taxonomy element $602_2$ and through a hierarchy of tagged elements where a higher level tagged taxonomy element $602_1$ applies to lower level tagged taxonomy elements $602_2$, $602_3$ in the hierarchy.

Figure 7:
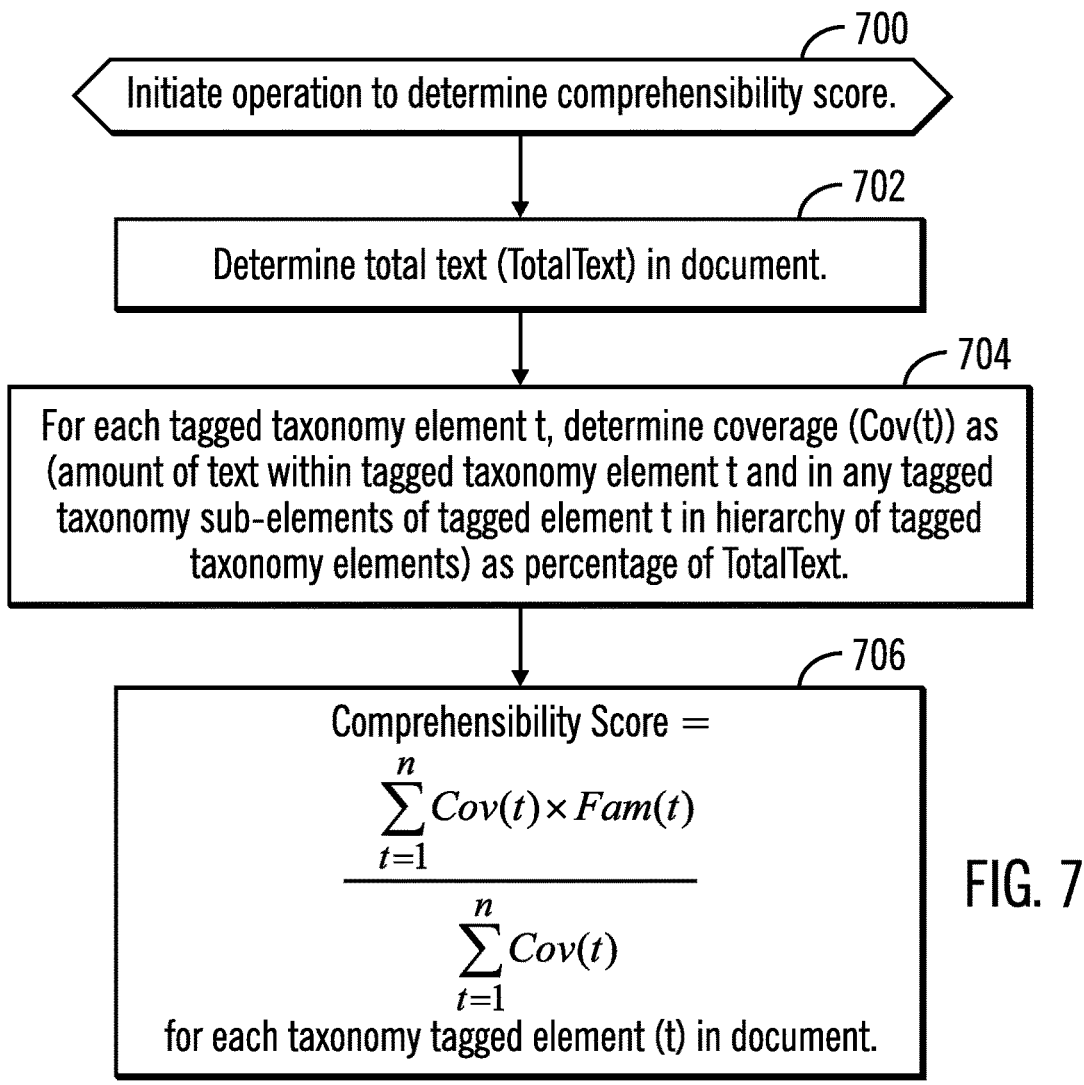
FIG. 7 illustrates an embodiment of operations to determine a comprehensibility score for a document annotated with a hierarchy of taxonomy topics, such as the document in FIG. 6.

FIG. 7 illustrates an embodiment of operations performed by the sort engine 124 to calculate the comprehensibility score for a document having a hierarchy of tagged taxonomy elements, such as shown in FIG. 6 with multiple taxonomy topics associated with a section of text, such as in a hierarchy of taxonomy topics. The operations of FIG. 7 may be performed as part of block 312 in FIG. 3 to determine the comprehensibility score for the search result documents 122. Upon initiating (at block 700) an operation to determine a comprehensibility score for a document 118, the sort engine 124 determines (at block 702) the total text in the document (TotalText), such as a number of words, characters, etc. For each tagged taxonomy element t, e.g., $602_1$, $602_2$, $602_3$, a determination is made (at block 704) of the coverage (Cov (t)) as (an amount of text (t) within the tagged taxonomy element t and in any tagged taxonomy sub-elements of tagged taxonomy element t in the hierarchy of tagged taxonomy elements) divided by the total text in the document 118. A comprehensibility score may then be calculated (at block 706) as equation (2) below:

$$\frac{\sum_{t=1}^{n} \text{Cov}(t) \times \text{Fam}(t)}{\sum_{t=1}^{n} \text{Cov}(t)} \quad (2)$$

Equation (2) represents the sum of the coverage (Cov(t)) of text for each tagged taxonomy element t and all tagged taxonomy sub-elements oft times the familiarity score (Fam (t)) for that taxonomy topic. A familiarity weighting for unassociated text is applied to Cov(t) for unassociated text (t). In one embodiment of equation (2) the familiarity of unassociated 404 text may be one, indicating full comprehensibility. In alternative embodiments, a different familiarity score less than one or zero may be applied to the unassociated text 404 not associated with a tagged taxonomy element.

Below are examples of familiarity scores for the taxonomy topics in FIG. 6:
topic A—0.8 (good familiarity)
topic B—1.0 (complete familiarity)
topic C—0.3 (some familiarity)
topic D—0.0 (no familiarity)

To calculate the score of this document against the user comprehensibility values shown above, the algorithm of FIG. 7 would result in the following calculations:

The total amount of text TotalText=1000 (words)
The word counts for the taxonomy topics are:
Topic A=300+100+100=500 words
Topic B=300 words
Topic C=300 words
Topic D=100 words
The weighted coverage values are:
Topic A=500/1000=0.5
Topic B=300/1000=0.3
Topic C=300/1000=0.3
Topic D=100/1000=0.1
No Topic=500/1000=0.5
Document comprehensibility score is:

$$\frac{0.5*0.8 + 0.3*10 + 03*0.3 + 0.1*0.0 + 0.5*1.0}{0.5 + 0.3 + 0.3 + 0.1 + 05}$$

or 0.76, indicating a document with reasonable comprehensibility to the reader. The unassociated text is assumed to have complete familiarity (1).

By contrast, if the user indicates that general background information in this domain is not comprehensible when not tagged against the taxonomy then the weighting for the unassociated text would be 0.0. In that case the document comprehensibility would be:

$$\frac{0.5*0.8 + 0.3*1.0 + 0.3*0.3 + 0.1*0.0 + 0.5*0.0}{0.5 + 0.3 + 0.3 + 0.1 + 0.5}$$

or 0.46, indicating a document with significantly less comprehensibility for the reader.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 8:
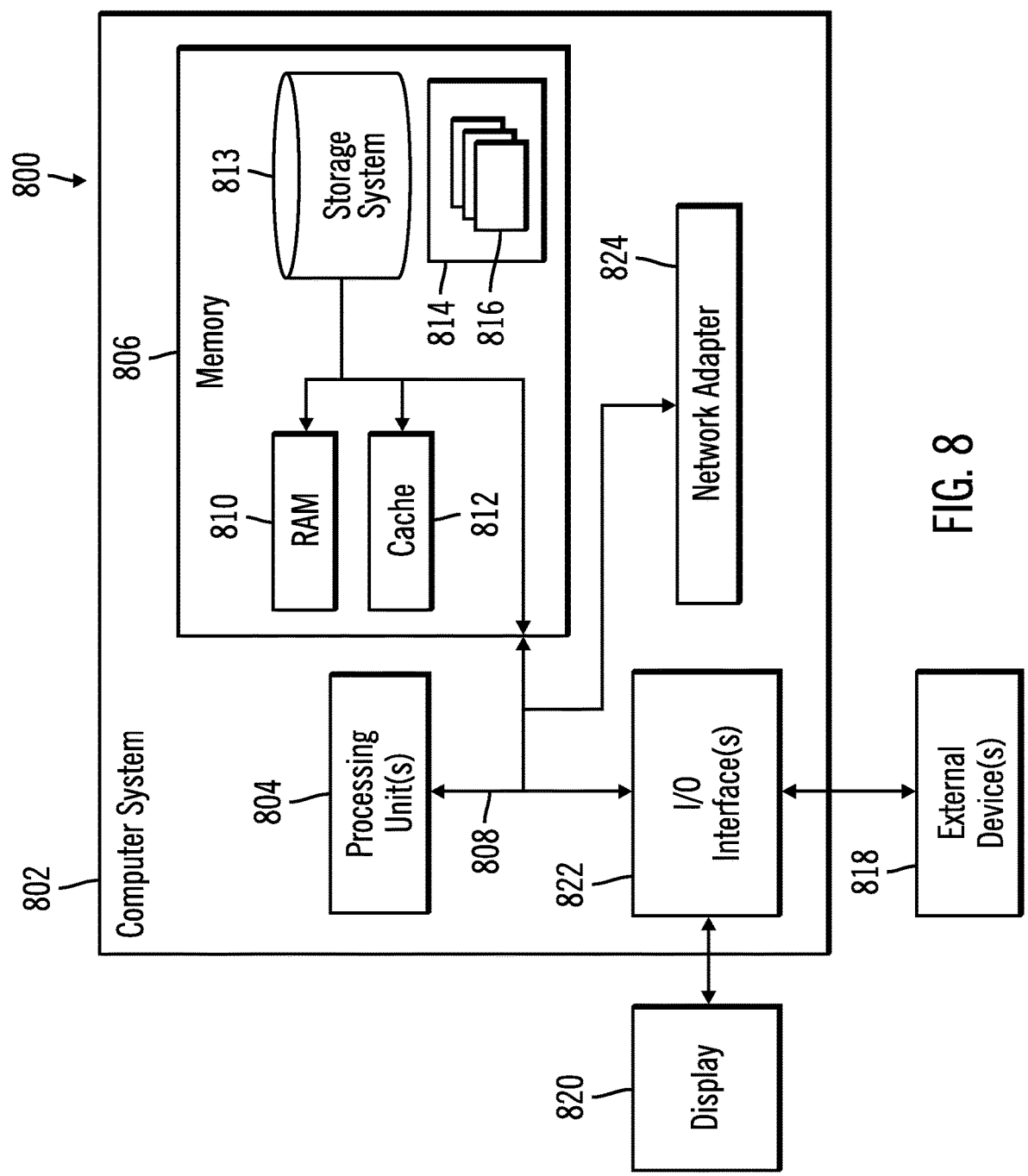
FIG. 8 illustrates a computing environment in which the components of FIG. 1 may be implemented.

The computational components of FIG. 1 of the search system 100 may be implemented in one or more computer systems, such as the computer system 802 shown in FIG. 8. Computer system/server 802 may be described in the general context of computer system executable instructions, such as program modules, being executed by a computer system. Generally, program modules may include routines, programs, objects, components, logic, data structures, and so on that perform particular tasks or implement particular abstract data types. Computer system/server 802 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 8, the computer system/server 802 is shown in the form of a general-purpose computing device. The components of computer system/server 802 may include, but are not limited to, one or more processors or processing units 804, a system memory 806, and a bus 808 that couples various system components including system memory 806 to processor 804. Bus 808 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 802 typically includes a variety of computer system readable media. Such media may be any available media that is accessible by computer system/server 802, and it includes both volatile and non-volatile media, removable and non-removable media.

System memory 806 can include computer system readable media in the form of volatile memory, such as random access memory (RAM) 810 and/or cache memory 812. Computer system/server 802 may further include other removable/non-removable, volatile/non-volatile computer system storage media. By way of example only, storage system 813 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 808 by one or more data media interfaces. As will be further depicted and described below, memory 806 may include at least one program product having a set (e.g., at least one) of program modules that are configured to carry out the functions of embodiments of the invention.

Program/utility 814, having a set (at least one) of program modules 816, may be stored in memory 806 by way of example, and not limitation, as well as an operating system, one or more application programs, other program modules, and program data. Each of the operating system, one or more application programs, other program modules, and program data or some combination thereof, may include an implementation of a networking environment. The components of the computer 802 may be implemented as program modules 816 which generally carry out the functions and/or methodologies of embodiments of the invention as described herein. The systems of FIG. 1 may be implemented in one or more computer systems 802, where if they are implemented in multiple computer systems 802, then the computer systems may communicate over a network.

Computer system/server 802 may also communicate with one or more external devices 818 such as a keyboard, a pointing device, a display 820, etc.; one or more devices that enable a user to interact with computer system/server 802; and/or any devices (e.g., network card, modem, etc.) that enable computer system/server 802 to communicate with one or more other computing devices. Such communication can occur via Input/Output (I/O) interfaces 822. Still yet, computer system/server 802 can communicate with one or more networks such as a local area network (LAN), a general wide area network (WAN), and/or a public network (e.g., the Internet) via network adapter 824. As depicted, network adapter 824 communicates with the other components of computer system/server 802 via bus 808. It should be understood that although not shown, other hardware and/or software components could be used in conjunction with computer system/server 802. Examples, include, but are not limited to: microcode, device drivers, redundant processing units, external disk drive arrays, RAID systems, tape drives, and data archival storage systems, etc.

The letter designators, such as i are used to designate a number of instances of an element may indicate a variable number of instances of that element when used with the same or different elements.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for determining an order in which to present documents to a user, wherein the computer program product comprises a computer readable storage medium having program instructions embodied therewith that when executed cause operations, the operations comprising:
   providing user information for a user having familiarity scores, comprising numerical values, for taxonomy topics indicating the user familiarity with the taxonomy topics, wherein the taxonomy topics are part of a domain of taxonomy topics;
   providing a document having different sections of text associated with different taxonomy topics;
   determining familiarity scores in the user information for the user for different taxonomy topics associated with the different sections of text in the document;
   for each section of text of the different sections of text in the document, determining a coverage of the section of text comprising an amount of text in the section of text as a percentage of total text in the document;
   calculating a comprehensibility score as a function of: (i) the coverages of the sections of text having familiarity scores and the familiarity scores of the sections of text having the familiarity scores and (ii) a percentage of text not associated with a taxonomy topic; and
   using the comprehensibility score for the document to determine an order in which to present the document to the user with a group of documents.

2. The computer program product of claim 1, wherein the group of documents and the document for which the comprehensibility score is determined comprise a search result set of documents returned in response to a search request from the user, wherein the operations further comprise:
   determining, for the documents in the group of documents, comprehensibility scores of the documents based on the different sections of text in the documents associated with the different taxonomy topics and the familiarity scores of the different taxonomy topics associated with the different sections of text.

3. The computer program product of claim 2, wherein the using the comprehensibility score for the documents to determine the order comprises:
   sorting the group of documents by comprehensibility scores determined for the documents according to the order, wherein the order indicates documents having highest comprehensibility scores first, wherein documents having a higher comprehensibility score are determined more comprehensible to the user based on the familiarity scores than documents having a lower comprehensibility score.

4. The computer program product of claim 2, wherein the operations further comprise:
   determining a domain of the search result set in a schema of taxonomy topics for different domains;
   determining whether the familiarity scores for the determined domain are stored for the user, wherein the familiarity scores comprise the stored familiarity scores for the user in response to determining that familiarity scores are stored for the user; and
   generating a user interface page including a list of the taxonomy topics for the determined domain and a field for each taxonomy topic in the list, wherein the user interface page is configured to receive user selected familiarity scores for the taxonomy topics in response to determining that familiarity scores for the domain are not stored for the user.

5. The computer program product of claim 1, wherein text in the document not associated with the taxonomy topics is rated as fully comprehensible in the determining the comprehensibility score.

6. The computer program product of claim 1, wherein the taxonomy topics are part of a domain of a schema of taxonomy topics, wherein the document includes tagged taxonomy elements indicating taxonomy topics associated with the different sections of text in the document, wherein at least one taxonomy topic is associated with a plurality of sections of text in the document, and wherein a plurality of taxonomy topics are associated with at least one of the sections of text in the document.

7. The computer program product of claim 1, wherein the calculating the comprehensibility score as the function of the coverages of the sections of text and the percentage of text not associated with a taxonomy topic comprises calculating a sum of: (i) a summation of a coverage of a section of text times a familiarity score of the section of text for all sections of text having a familiarity score and (ii) a percentage of text not associated with a taxonomy topic.

8. A computer program product for determining an order in which to present documents to a user, wherein the computer program product comprises a computer readable storage medium having program instructions embodied therewith that when executed cause operations, the operations comprising:
providing a document having different sections of text associated with different taxonomy topics, wherein one section of text is associated with a plurality of taxonomy topics;
determining, from user information, familiarity scores for different taxonomy topics associated with the different sections of text in the document, wherein the taxonomy topics are part of a domain of taxonomy topics, wherein the familiarity scores indicate user familiarity with the different taxonomy topics associated with different sections of text in the document;
for each section of text of the different sections of text in the document, determining a coverage of the section of text comprising an amount of text in the section of text as a percentage of total text in the document;
calculating a comprehensibility score as a function of: (i) the coverages of the sections of text having familiarity scores and the familiarity scores of the sections of text having the familiarity scores and (ii) a percentage of text not associated with a taxonomy topic; and
using the comprehensibility score for the document to determine an order in which to present the document to the user with a group of documents.

9. The computer program product of claim 8, wherein the document includes a hierarchy of tagged taxonomy elements for the different sections of text including a first level tagged taxonomy element nesting a plurality of second level tagged taxonomy elements at a lower level in the hierarchy than the first level tagged taxonomy element, wherein each of the second level tagged taxonomy elements is associated with a section of text, wherein the determining the comprehensibility score comprises applying a familiarity score associated with the first level tagged taxonomy element to the sections of text associated with the nested second level tagged taxonomy elements, and wherein the familiarity score of each second level tagged taxonomy elements is applied to the section of text associated with the second level tagged taxonomy element.

10. The computer program product of claim 8, wherein the calculating the comprehensibility score as a function of the coverages of the section of text comprises calculating a summation of a coverage of a section of text times each of at least one familiarity score associated with the section of text for the sections of text.

11. The computer program product of claim 10, wherein the summation further includes the coverage of unassociated text multiplied by a familiarity score for unassociated text.

12. A system for determining an order in which to present documents to a user, comprising:
a processor; and
a computer readable storage medium having program instructions embodied therewith that when executed cause operations, the operations comprising:
providing user information having familiarity scores, comprising numerical values, for taxonomy topics indicating user familiarity with the taxonomy topics, wherein the taxonomy topics are part of a domain of taxonomy topics;
providing a document having different sections of text associated with different taxonomy topics;
determining familiarity scores in the user information for different taxonomy topics associated with the different sections of text in the document;
for each section of text of the different sections of text in the document, determining a coverage of the section of text comprising an amount of text in the section of text as a percentage of total text in the document;
calculating a comprehensibility score as a function of: (i) the coverages of the sections of text having familiarity scores and the familiarity scores of the sections of text having the familiarity scores and (ii) a percentage of text not associated with a taxonomy topic; and
using the comprehensibility score for the document to determine an order in which to present the document to the user with a group of documents.

13. The system of claim 12, wherein the group of documents and the document for which the comprehensibility score is determined comprise a search result set of documents returned in response to a search request from the user, wherein the operations further comprise:
determining, for the documents in the group of documents, comprehensibility scores of the documents based on different sections of text in the documents associated with different taxonomy topics and the familiarity scores of the different taxonomy topics associated with the different sections of text.

14. The system of claim 13, wherein the using the comprehensibility score for the documents to determine the order comprises:
sorting the group of documents by comprehensibility scores determined for the documents according to the order, wherein the order indicates documents having highest comprehensibility scores first, wherein documents having a higher comprehensibility score are determined more comprehensible to the user based on the familiarity scores than documents having a lower comprehensibility score.

15. The system of claim 12, wherein text in the document not associated with the taxonomy topics is rated as fully comprehensible in the determining the comprehensibility score.

16. The system of claim 12, wherein the taxonomy topics are part of a domain of a schema of taxonomy topics, wherein the document includes tagged taxonomy elements indicating taxonomy topics associated with sections of text in the document, wherein at least one taxonomy topic is associated with a plurality of sections of text in the document, and wherein a plurality of taxonomy topics are associated with at least one of the sections of text in the document.

17. A system for determining an order in which to present documents to a user, comprising:
a processor; and
a computer readable storage medium having program instructions embodied therewith that when executed cause operations, the operations comprising:
providing a document having different sections of text associated with different taxonomy topics, wherein one section of text is associated with a plurality of taxonomy topics, wherein the taxonomy topics are part of a domain of taxonomy topics;
determining, from user information, familiarity scores for different taxonomy topics associated with the different sections of text in the document, wherein the familiarity scores indicate a user familiarity with the different taxonomy topics associated with different sections of text in the document;

for each section of text of the different sections of text in the document, determining a coverage of the section of text comprising an amount of text in the section of text as a percentage of total text in the document;

calculating a comprehensibility score as a function of: (i) the coverages of the sections of text having familiarity scores and the familiarity scores of the sections of text having the familiarity scores and (ii) a percentage of text not associated with a taxonomy topic; and using the comprehensibility score for the document to determine an order in which to present the document to the user with a group of documents.

18. The system of claim 17, wherein the document includes a hierarchy of tagged taxonomy elements for the sections of text including a first level tagged taxonomy element nesting a plurality of second level tagged taxonomy elements at a lower level in the hierarchy than the first level tagged taxonomy element, wherein each of the second level tagged taxonomy elements is associated with a section of text, wherein the determining the comprehensibility score comprises applying a familiarity score associated with the first level tagged taxonomy element to the sections of text associated with the nested second level tagged taxonomy elements, and wherein the familiarity score of each second level tagged taxonomy elements is applied to the section of text associated with the second level tagged taxonomy element.

19. The system of claim 17, calculating the comprehensibility score as a function of the coverages of the section of text comprises calculating a summation of a coverage of a section of text times each of at least one familiarity score associated with the section of text for the sections of text.

20. A computer implemented method for determining an order in which to present documents to a user, comprising:

providing user information having familiarity scores, comprising numerical values, for taxonomy topics indicating user familiarity with the taxonomy topics, wherein the taxonomy topics are part of a domain of taxonomy topics;

providing a document having different sections of text associated with different taxonomy topics;

determining familiarity scores in the user information for different taxonomy topics associated with the different sections of text in the document;

for each section of text of the different sections of text in the document, determining a coverage of the section of text comprising an amount of text in the section of text as a percentage of total text in the document;

calculating a comprehensibility score as a function of: (i) the coverages of the sections of text having familiarity scores and the familiarity scores of the sections of text having the familiarity scores and (ii) a percentage of text not associated with a taxonomy topic; and using the comprehensibility score for the document to determine an order in which to present the document to the user with a group of documents.

21. The method of claim 20, wherein the group of documents and the document for which the comprehensibility score is determined comprise a search result set of documents returned in response to a search request from the user, further comprising:

determining, for the documents in the group of documents, comprehensibility scores of the documents based on the sections of text in the documents associated with the taxonomy topics and the familiarity scores of the taxonomy topics associated with the different sections of text.

22. The method of claim 21, wherein the using the comprehensibility score for the documents to determine the order comprises:

sorting the group of documents by comprehensibility scores determined for the documents according to the order, wherein the order indicates documents having highest comprehensibility scores first, wherein documents having a higher comprehensibility score are determined more comprehensible to the user based on the familiarity scores than documents having a lower comprehensibility score.

23. The method of claim 20, wherein text in the document not associated with the taxonomy topics is rated as fully comprehensible in the determining the comprehensibility score.

24. The method of claim 20, wherein the taxonomy topics are part of a domain of a schema of taxonomy topics, wherein the document includes tagged taxonomy elements indicating taxonomy topics associated with sections of text in the document, wherein at least one taxonomy topic is associated with a plurality of sections of text in the document, and wherein a plurality of taxonomy topics are associated with at least one of the sections of text in the document.

25. The method of claim 20, wherein the calculating the comprehensibility score as the function of the coverages of the sections of text and the percentage of text not associated with a taxonomy topic comprises calculating a sum of: (i) a summation of a coverage of a section of text times the familiarity score of the section of text for all sections of text having a familiarity score and (ii) a percentage of text not associated with a taxonomy topic.

* * * * *